United States Patent [19]

Fitzgerald et al.

[11] Patent Number: 4,680,511
[45] Date of Patent: Jul. 14, 1987

[54] VIDEO APPARATUS FOR GENERATING A CONDUCTIVELY ISOLATED CONTROL SIGNAL

[75] Inventors: William V. Fitzgerald; Ronald E. Fernsler; Kevin E. Nortrup, all of Indianapolis, Ind.

[73] Assignee: RCA Corporation, Princeton, N.J.

[21] Appl. No.: 845,689

[22] Filed: Mar. 28, 1986

[51] Int. Cl.[4] .............................................. H01J 29/70
[52] U.S. Cl. .................................. 315/411; 358/190; 358/194.1
[58] Field of Search .............. 315/411; 358/190, 194.1

[56] References Cited

U.S. PATENT DOCUMENTS

| | | | |
|---|---|---|---|
| 4,185,234 | 1/1980 | Baker | 315/411 |
| 4,392,090 | 7/1983 | Rinehart et al. | 315/411 |
| 4,441,052 | 4/1984 | Willis | 315/8 |
| 4,516,168 | 5/1985 | Hicks | 358/190 |
| 4,516,169 | 5/1985 | Truskalo | 358/190 |

OTHER PUBLICATIONS

Service Manual entitled RCA Color Television Basic Service Data, CTC 131 Series, Published in 1984 by RCA Corporation (cover sheet and p. 8).
U.S. patent application No. 760,545 entitled Circuit for Generating a Clock Signal at an AC Line Frequency, in the names of D. H. Willis et al.

Primary Examiner—Theodore M. Blum
Attorney, Agent, or Firm—Eugene M. Whitacre; Joseph J. Laks; Sammy S. Henig

[57] ABSTRACT

An input signal for controlling a television power supply has "power-on" and "power-off" signal states. When the input signal is in the "power-on" state, it couples a clock signal to a primary winding of a transformer causing an alternating current voltage that is conductively isolated from the input signal to be developed across a secondary winding of the transformer. When the input signal is in the "power-off" state, it decouples the clock signal from the primary winding so that no alternating current voltage is developed across the secondary winding. The signal across the secondary winding is demodulated in a demodulator that produces a control signal that is conductively isolated from the input signal. The control signal is coupled to a regulator of the power supply. A power-on state of the control signal occurs when the alternating current voltage is developed at the secondary winding terminal. A power-off state of the control signal occurs when the alternating current voltage is absent.

20 Claims, 4 Drawing Figures

VIDEO APPARATUS FOR GENERATING A CONDUCTIVELY ISOLATED CONTROL SIGNAL

The invention relates to a circuit that couples a control signal from a control circuit to a utilization circuit that is conductively isolated from the control circuit.

Some television receivers have signal terminals for receiving, for example, external video input signals such as R, G and B input signals, that are to be developed relative to the common conductor of the receiver. Such signal terminals and the receiver common conductor may be coupled to corresponding signal terminals and common conductors of external devices, such as, for example, a VCR or a teletext decoder.

To simplify the coupling of signals between the external devices and the television receiver, the common conductors of the receiver and of the external devices are connected together so that all are at the same potential. The signal lines of each external device are coupled to the corresponding signal terminals of the receiver. In such an arrangement, the common conductor of each device, such as of the television receiver, may be held "floating", or conductively isolated, relative to the corresponding AC mains supply source that energizes the device. When the common conductor is held floating, a user touching a terminal that is at the potential of the common conductor will not suffer an electrical shock. Such electrical shock may occur if the common conductor is not held floating. Furthermore, having the common conductor floating avoids an undesirable current flow, or a current loop, among the common conductors of the devices that are, as described above, connected together.

Therefore, it may be desirable to isolate the common conductor, or ground, of, for example, the television receiver from the potentials at the terminals of the AC mains supply source that provides power to the television receiver. Such isolation is typically achieved by a transformer, as described below. The isolated common conductor is sometimes referred to as "cold" ground conductor.

In some television receivers the AC mains supply voltage is coupled directly to a bridge rectifier for producing an unregulated direct current (DC) input voltage. The unregulated DC input voltage may be applied to a switching, or chopper, power supply having a chopper transformer that generates regulated DC voltages. The regulated DC voltages are developed, typically, from a secondary winding of the chopper transformer, relative to the cold ground conductor. The chopper transformer conductively isolates the regulated voltages, thus causing them to be floating, relative to the potentials at terminals of the AC mains supply voltage source.

Circuit networks of the power supply that provide voltages that are not floating relative to the potentials at the AC mains supply voltage source terminals, such as voltages at the primary winding of the chopper transformer, are referenced to a common conductor that is, therefore, floating relative to the cold ground conductor and that is sometimes referred to as "hot" ground conductor.

Some television circuits that are energized from the regulated DC voltages utilize the cold ground conductor as the common conductor. When external video devices are coupled to the receiver, the cold ground conductor that provides current return path to, for example, the video signals of the receiver is also connected to the common conductors of the external video devices. Therefore, by making each of the common conductors floating, the above-mentioned undesirable flow in a current loop among the common conductors is eliminated. Futhermore, a user who touches the floating common conductor will not suffer an electrical shock.

It is desirable to maintain isolation between the hot and cold ground conductors of the television receiver when coupling a control signal from, for example, a control circuit of the television receiver that is referenced to the cold ground conductor, to a section of the power supply circuit of the television receiver that is referenced to the hot ground conductor.

In some television systems it may be advantageous to have the control section of the power supply referenced to the hot ground conductor; whereas the on/off input signal that is generated by a remote control unit may be referenced to the cold ground conductor. In order to couple the on/off input signal that is referenced to the cold ground conductor to the control section that is referenced to the hot ground conductor of, for example, a switch mode power supply, some prior art circuits utilize a relay having a control winding that is conductively coupled to the cold ground conductor. In such prior art circuits, the on/off input signal that is referenced to the cold ground conductor is conductively coupled to the control winding of the relay. A pair of contacts that are magnetically activated by the current in the control winding are conductively coupled to the control section of the switch mode, or chopper, power supply that is referenced to the hot ground conductor. The closure and separation of the contacts of the pair of contacts control the on/off operation of the power supply, in accordance with the information contained in the "cold" on/off input signal in the control winding of the relay. Both contacts of the pair of contacts are conductively isolated from the on/off input signal that is coupled to the control winding. Thus, the on/off input signal is magnetically coupled across the cold-hot barrier formed by the relay without affecting the conductive isolation across the cold-hot barrier. A disadvantage of such on/off input signal coupling arrangement is that it is bulky, not highly reliable because it utilizes the moving mechanical parts of the relay, and consumes excessive power when, for example, the relay is energized.

In other television systems the on/off input signal coupling arrangement includes a photo-coupler that couples the on/off input signal by a cooperating pair of electrical-to-optical and optical-to-electrical transducers. A disadvantage of such coupling arrangement is that the level of the signal produced by, for example, the optical-to-electrical transducer is a low and thus such low level signal may be susceptible to noise. Another disadvantage is that such photo-coupler may be, relatively, expensive. Additionally, the conductive isolation in the photo-coupler between the input and output signals may not be adequate in some television applications.

In accordance with an aspect of the invention, a power supply control apparatus responsive to an input signal that contains power on and power off control information produces a control signal that controls the on-off operation of a power supply. A modulator produces from a first signal that contains an alternating current (AC) component signal a modulated signal that is modulated in accordance with the input signal. The control signal is produced from the modulated signal.

In accordance with another aspect of the invention, the modulated signal is magnetically coupled to the power supply such that the control signal that is produced from the modulated signal is conductively isolated from the input signal.

In carrying out an aspect of the invention, the input signal has first and second signal states. The input signal modulates a carrier signal for producing the a modulated signal in accordance with the corresponding state of the input signal. Illustratively, when the input signal is at the first signal state, the modulated signal contains the AC component signal; In contrast, when the input signal is at the second signal state the modulated signal does not contain the AC component signal. The modulated signal is applied to a primary winding of a transformer. The signal at the secondary winding of the transformer that is coupled from the primary winding of the transformer is conductively isolated from the control circuit and from the input signal by the isolation between the secondary and primary windings. The signal at the secondary winding is demodulated in a demodulator for generating the control, or output, signal having, for example, first and second signal states that correspond with the first and second signals states of the input signal. The output signal is coupled to a control terminal of a power supply that is conductively isolated by the transformer from the input signal for controlling the power supply in accordance with the first and second signal states of the input signal.

In an embodiment of the invention, the input signal is generated by a remote control circuit that is referenced to a cold ground conductor of a television receiver. When the input signal is at the first state, the television receiver power supply is turned on. When the input signal is at the second state, the power supply is turned off. When the input signal is at the first, or "power-on" state, a clock signal of a constant duty cycle is coupled to a primary winding of a transformer. On the other hand, when the input signal is at the second, or the "power-off" state, the clock signal is not coupled to the primary winding. The signal at the primary winding is, thus, amplitude modulated by the input signal. When the clock signal is coupled to the primary winding, the AC component signal of the clock signal is magnetically coupled across a hot-cold barrier formed by the transformer to a secondary winding. On the other hand, when the clock signal is not coupled to the primary winding, corresponding with the input signal being at the second state, the signal in the secondary winding does not contain the AC component signal and is, illustratively, at zero volts. An amplitude demodulator demodulates the signal in the secondary winding to generate the output or control signal that is conductively isolated from the cold ground conductor of the remote control circuit. The output signal is coupled to a regulator of the power supply that is reference to the hot ground conductor. Illustratively, the output signal remains at a "power-on", or a first state, as long as the clock signal is coupled to the primary winding and remains at a "power-off", or a second state, as long as the clock signal is not coupled to the primary winding. The first and second states of the output signal correspond with the "power-on" and "power-off" states, respectively, of the input signal of the remote control circuit for turning-on and turning-off the power supply, respectively. In this way, each state of the input signal determines the corresponding state of the output signal that is conductively isolated from the input signal.

In a typical television display system, a high voltage ultor accelerating potential is applied to the final anode electrode of a picture tube to accelerate an electron beam generated at a picture tube cathode onto a phosphor screen. To ensure that the television receiver will not be operated, under fault conditions, at excessive ultor potential levels, a high voltage protection circuit is incorporated in the television receiver circuitry.

In carrying out an aspect of the invention, the high voltage protection circuit causes the shut-down of the high voltage power supply by the output signal of the demodulator. The output signal of the demodulator is at the "power-off" state when the high voltage becomes excessive.

In accordance with another aspect of the invention, a fault indicative signal that is referenced to the cold ground conductor, and that is representative of, for example, excessive ultor voltage is also coupled to the primary winding of the transformer that was described before. The fault indicative signal causes the output signal from the demodulator to assume the second, or "power-off", state that causes the shut-down of the high voltage power supply when the ultor voltage becomes excessive.

Figure 1:
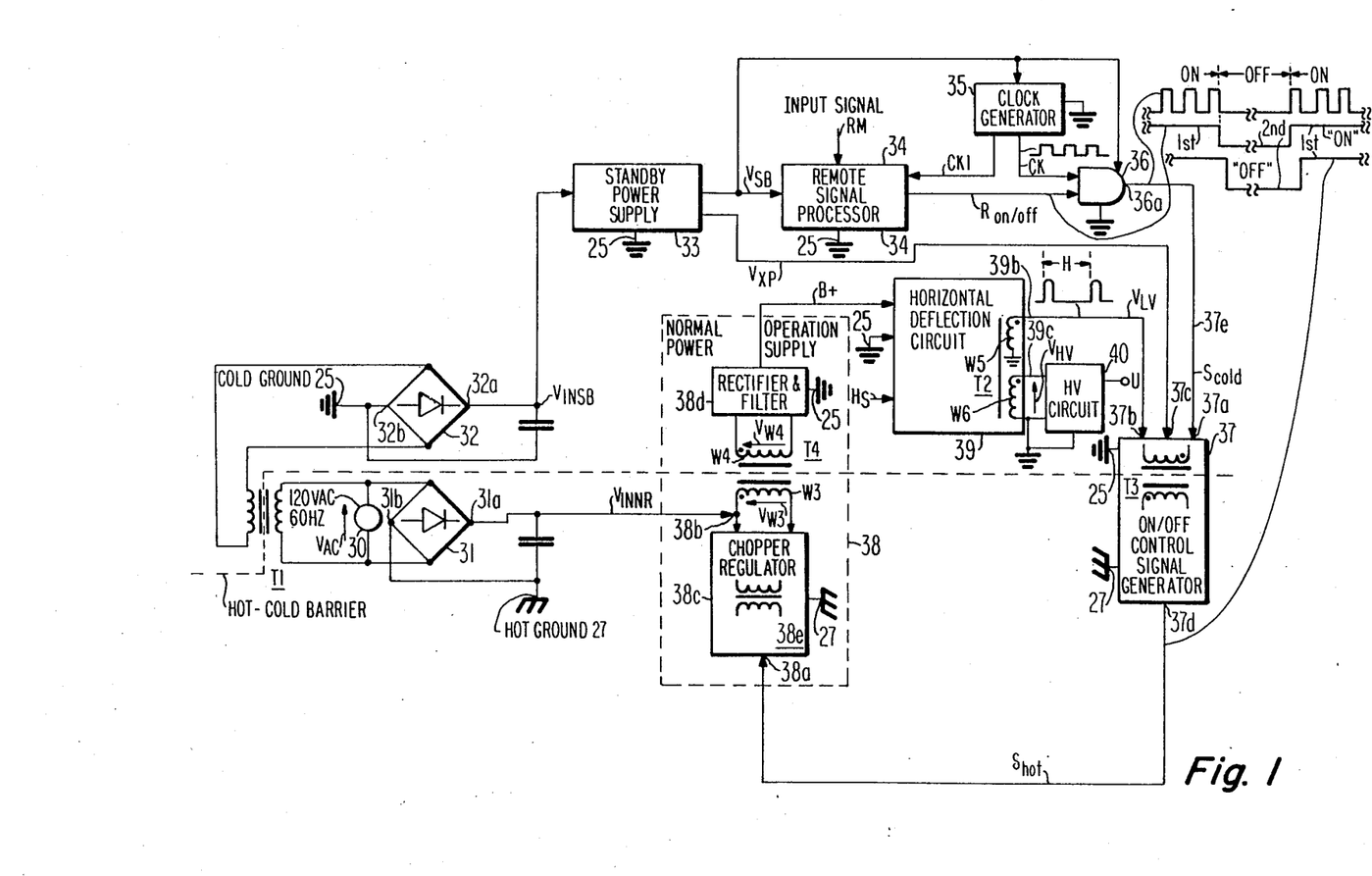
FIG. 1 illustrates a block diagram of a television receiver power supply system that includes an on/off control signal generator, embodying an aspect of the invention.

FIG. 1 illustrates a power supply system of a television receiver. In FIG. 1, an AC mains supply 30 provides a voltage $V_{AC}$ that is conductively coupled to a pair of input terminals of a bridge rectifier 31. Bridge rectifier 31 produces, in a conventional manner, an unregulated DC voltage $V_{INNR}$ at an output terminal 31a that is referenced to a current return terminal 31b of rectifier 31. Terminal 31b provides the potential of a first common conductor, referred to as a hot ground conductor 27. Voltage $V_{AC}$ is also magnetically coupled by a transformer T1 to a bridge rectifier 32 that similarly produces, an unregulated DC voltage $V_{INSB}$ at an output terminal 32b that is referenced to a current return terminal 32b. Terminal 32b provides the potential of a second common conductor, referred to as a cold ground conductor 25. Voltage $V_{INSB}$ is conductively isolated from voltage $V_{INNR}$ because of the conductive isolation provided by transformer T1.

Voltage $V_{INSB}$ energizes a conventionally built standby power supply 33 that produces a regulated DC voltage $V_{SB}$ that provides power to a remote signal processor 34 even when the television receiver raster is not produced. Conventionally built remote signal processor 34 that is referenced to cold ground conductor 25 receives an input signal RM. Signal RM is indicative of "power-on" and "power-off" user commands that are initiated when such user wishes to turn on and turn off the display operation, respectively. Signal RM is conventionally generated by, for example, an infrared remote receiver, not shown in FIG. 1. Signal RM is used in processor 34 for generating an on/off signal $R_{on/off}$. A first state of signal $R_{on/off}$ is used for turning on a normal operation power supply 38; whereas a second state of signal $R_{on/off}$ is used for turning off power supply 38. Processor 34 may include a microcomputer that processes signal RM for generating signal $R_{on/off}$ and that receives a clock CK1 for its operation. Clock CK1 is generated by a clock generator 35. Clock generator 35 includes, illustratively, an oscillator that provides an input signal to a frequency dividing chain, not shown in FIG. 1. Clock CK1 that is obtained from the frequency dividing chain provides the conventional clock signal to the circuitry of remote signal processor 34. Clock generator 35 also generates, for example, a 32 KHZ clock CK obtained from the frequency dividing chain, that is not shown in FIG. 1, used for generating a signal $S_{cold}$.

In carrying out an aspect of the invention, clock CK and on/off signal $R_{on/off}$ are coupled to first and second input terminals, respectively, of an "AND" gate 36. Signal $S_{cold}$, developed on a line 37e at an output terminal 36a of "AND" gate 36 is referenced to cold ground conductor 25. When signal $R_{on/off}$ is at logical "TRUE", that is representative of the first, or "power-on", state of signal $R_{on/off}$, "AND" gate 36 causes signal $S_{cold}$ to toggle alternately between logical "TRUE" and logical "FALSE" states at the frequency of clock CK. On the other hand, when signal $R_{on/off}$ is at logical "FALSE", that is representative of the "power-off", or second, state, signal $R_{on/off}$ prevents the clock pulses of clock CK from appearing on line 37e. Therefore, signal $S_{cold}$ is continuously at logical "FALSE" state. Thus, "AND" gate 36 produces from clock CK signal $S_{cold}$ that is modulated in accordance with signal $R_{on/off}$.

Signal $S_{cold}$ is coupled to an input terminal 37a of an on/off control signal generator 37, embodying yet another aspect of the invention. Generator 37 is energized by a DC voltage $V_{XP}$ that is referenced to cold ground conductor 25 and that is generated by standby power supply 33. Generator 37 includes a transformer T3 that magnetically couples, under normal operating conditions, the signal component at the frequency of clock CK that is contained in signal $S_{cold}$ when signal $R_{on/off}$ is at the "power-on" state, for generating a corresponding "power-on", or first, state of an on/off input signal $S_{hot}$ at terminal 37d. Signal $S_{hot}$ that contains only on/off control information is referenced to hot ground conductor 27. When signal $S_{cold}$ is at the logical "FALSE" state, occurring when signal $R_{on/off}$ is at the "power-off" state, signal $S_{cold}$ does not include the signal component at the frequency of clock CK. Illustratively, so long as signal $S_{cold}$ that is coupled to transformer T3 does not contain a signal component at the frequency of clock CK, control signal $S_{hot}$ is caused to be at a corresponding "power-off", or second, state. Control signal $S_{hot}$, that is conductively isolated from cold ground conductor 25 by the magnetic coupling of transformer T3 of generator 37, is coupled to an on/off control terminal 38a of a conventionally built chopper switch regulator control section 38c of normal operation switching power supply 38. Control section 38c is referenced to hot ground conductor 27. Control section 38c may include, illustratively, a driver transformer 38e that provides the drive to a chopper switch, not shown in FIG. 1. Each winding of transformer 38e may be referenced to hot ground conductor 27. When signal $S_{hot}$ is in the "power-on" state, chopper regulator control section 38c generates, in a conventional manner, an alternating current voltage $V_{W3}$ that is developed across a primary winding W3 of a chopper transformer T4 that is powered by unregulated DC voltage $V_{INNR}$. An induced voltage $V_{W4}$ across a secondary winding W4 of transformer T4 is coupled to a conventional rectifier and filter unit 38d that generates, by rectifying voltage $V_{W4}$, a regulated voltage B+ that is referenced to cold ground conductor 25. Isolation between hot ground conductor 27 and voltage B+ is obtained in a conventional manner by the conductive isolation between windings W3 and W4 of transformer T4. On the other hand, when signal $S_{hot}$ is in the "power-off" state, that occurs when signal $R_{on/off}$ is at the "power-off" state, power supply 38 is turned off by signal $S_{hot}$ causing a voltage B+ to be zero. Thus, windings W3 and W4 are located on the opposite sides of a hot-cold barrier that isolates signals $S_{hot}$ from signal $R_{on/off}$.

In accordance with an aspect of the invention, the regulation of voltage B+ that is referenced to cold ground conductor 25 is performed on the "hot" side of the hot-cold barrier. Signal $S_{hot}$ that is referenced to hot ground conductor 27 turns on and off, respectively, voltage B+. Advantageously, driver transformer 38e need not serve as an isolation transformer, thereby simplifying the transformer design.

Voltage B+ provides power to a conventionally built horizontal deflection circuit 39 that produces horizontal deflection current cycles in a deflection winding, not shown in FIG. 1, in accordance with timing information derived from a horizontal sync signal $H_S$. Deflection circuit 39 includes a flyback transformer T2, partially shown in FIG. 1, having a tertiary winding W6 that provides at a terminal 39c of circuit 39 a deflection rate retrace pulse $V_{HV}$. Terminal 39c is coupled to a high voltage, or ultor, circuit, 40 that produces an ultor voltage U at a level that is determined according to, for example, the positive peak value of pulse $V_{HV}$. A secondary winding W5 of flyback transformer T2 produces a deflection rate retrace pulse $V_{LV}$. Each pulse $V_{LV}$ has a positive peak of, for example, 20 volts at a terminal 39b of circuit 39. Because of the tight magnetic coupling of transformer T2, the positive peak voltage of pulse $V_{LV}$ is also representative of the level of ultor voltage U.

Pulse $V_{LV}$ is coupled to an input terminal 37b of on/-off input signal generator 37. When the positive peak of pulse $V_{LV}$ exceeds a predetermined threshold voltage, representative of a corresponding level of ultor voltage U, pulse $V_{LV}$ causes signal $S_{hot}$ to be at the second, or "power-off", state, regardless of the state of signal $R_{on/-off}$. When signal $S_{hot}$ is in the second state, power supply 38 causes voltage B+ to become zero. When voltage B+ is zero, ultor voltage U becomes zero, because retrace pulse $V_{HV}$ at terminal 39c of transformer T2 is no longer produced. When the positive peak of pulse $V_{LV}$ does not exceed the predetermined threshold level, pulse $V_{LV}$ does not affect signal $S_{hot}$. Thus, in accordance with a further aspect of the invention, the information in pulse $V_{LV}$ is coupled to generated 37 for establishing high voltage, or X-ray, protection.

Figure 2:
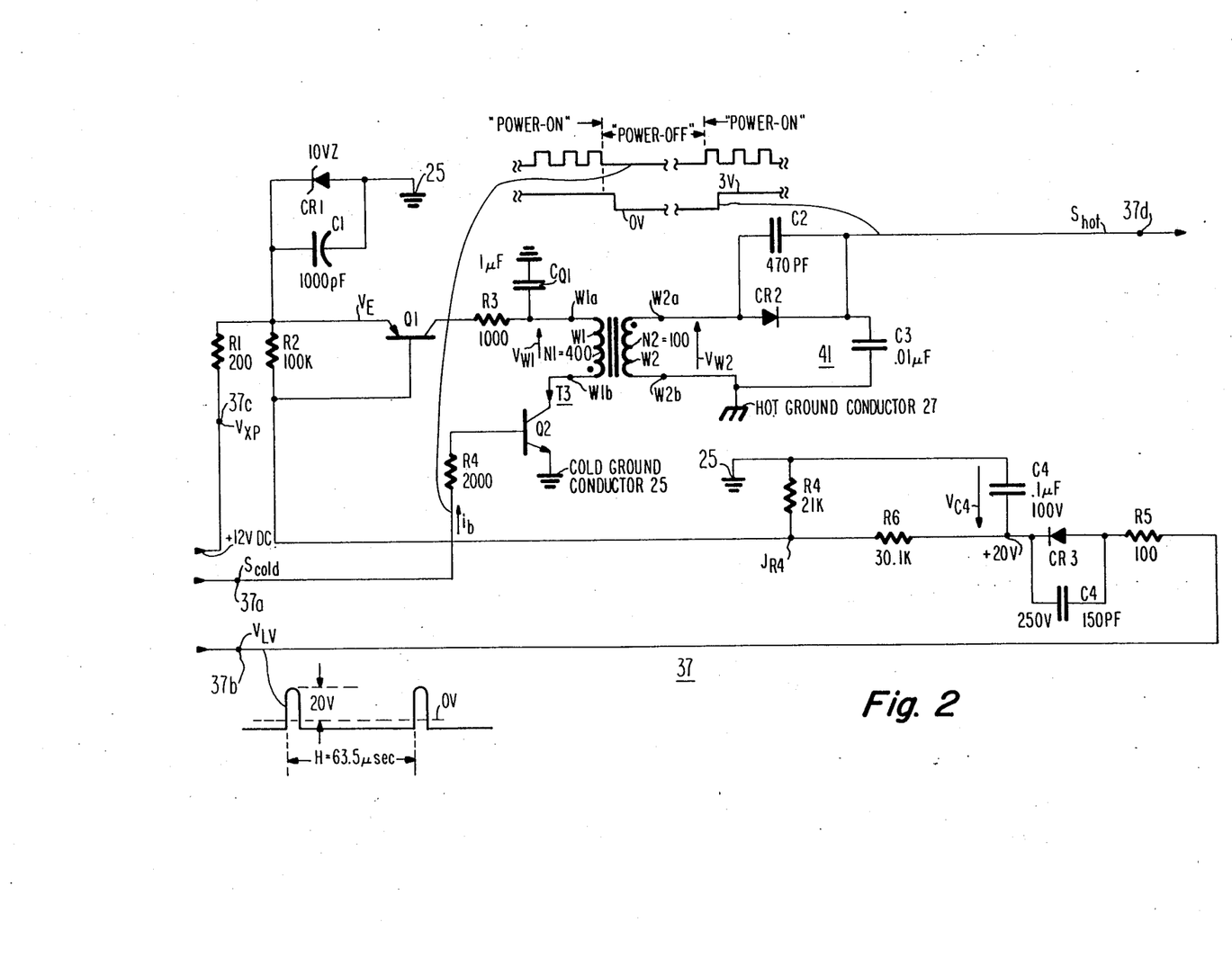
FIG. 2 illustrates a first detailed embodiment of the on/off control signal generator of FIG. 1, embodying another aspect of the invention.

FIG. 2 illustrates detailed schematic diagram of on/-off control signal generator 37 of FIG. 1, embodying aspects of the invention. Similar numbers and symbols in FIGS. 1 and 2 indicate similar items or functions. In FIG. 2, energizing voltage $V_{XP}$, supplied from standby supply 33 that is referenced to cold ground conductor 25, is coupled through a current limiting resistor R1 to the cathode electrode of a zener diode CR1 that develops a voltage $V_E$ of 10 volts across diode CR1. Voltage $V_E$ is coupled to the emitter electrode of a transistor Q1. The base electrode of transistor Q1 is supplied, under normal operating condition of ultor voltage U, with sufficient base current to maintain transistor Q1 turned-on so as to couple voltage $V_E$ to the collector electrode of transistor Q1. The voltage at the collector electrode of transistor Q1 is coupled through a current limiting resistor R3 to an end terminal W1a of a primary winding W1 of transformer T3. A filter capacitor $C_{Q1}$ is coupled between terminal W1a and cold ground conductor 25. The other end terminal of winding W1, a terminal W1b, is coupled to the collector electrode of a transistor switch Q2. The emitter electrode of transistor switch Q2 is coupled to cold ground conductor 25. Control signal $S_{cold}$ that is referenced to cold ground conductor 25 is coupled through a resistor R4 to the base electrode of transistor switch Q2. Control signal $S_{cold}$ provides, through resistor R4, a train of base electrode current pulses $i_b$ at the frequency of clock CK of FIG. 1 that flows in the base electrode of transistor switch Q2 of FIG. 2 throughout the period in which signal $R_{on/off}$ of FIG. 1 is at the "power-on" state. The train of base electrode current pulses $i_b$ of FIG. 2 causes the switching-on and switching-off, alternately, of transistor switch Q2 that is coupled between terminal W1b and cold ground conductor 25. The alternating switching of transistor switch Q2 at the frequency of clock CK of FIG. 1 causes an AC voltage $V_{W1}$ of FIG. 2 to be developed across primary winding W1. Capacitor $C_{Q1}$ maintains voltage $V_{W1}$, at a substantially constant level when switch Q2 is conductive for developing an upramping current in winding W1. AC voltage $V_{W1}$ across primary winding W1 is coupled by transformer action of transformer T3 to a secondary winding W2 for developing an AC voltage $V_{W2}$ between a terminal W2a and a terminal W2b that is coupled to hot ground conductor 27.

A demodulator or detector 41 includes a diode CR2. The anode electrode of diode CR2 is coupled to terminal W2a of transformer T3. One plate of a capacitor C3 is coupled to both output terminal 37d of generator 37 and to the cathode electrode of diode CR2. The other plate of capacitor C3 is coupled to hot ground conductor 27. Diode CR2 rectifies signal $V_{W2}$ in winding W2, that is conductively isolated from cold ground conductor 25, for developing signal $S_{hot}$ at terminal 37d.

In carrying out another aspect of the invention, diode CR2 may be coupled to winding W2 by a passive coupling arrangement such that, for example, signal $V_{W2}$ appears at the anode of diode CR2. Thus, the energy for generating signal $S_{hot}$ may be supplied entirely by signal $V_{W2}$ across winding W2.

Signal $S_{hot}$ that is referenced to hot ground conductor 27a is at a level that is substantially equal to the peak positive voltage of signal $V_{W2}$ that is developed across capacitor C3. The input resistance that is not shown in FIG. 2, from terminal 38a of power supply 38 to hot ground conductor 27, provides a discharge trickle current path to the charge in capacitor C3 so that signal $S_{hot}$ can change state from the first to the second state when signal $S_{cold}$ is continuously at the "FALSE", or "power-off" state. Thus, when transistor switch Q2 is turned on and turned off, alternately, by pulsed signal $S_{cold}$, corresponding with the "power-on" state of signal $R_{on/off}$, AC signal $V_{W2}$ is developed at secondary winding W2 causing signal $S_{hot}$ to be at the "power-on" state. On the other hand, throughout the period in which input signal $S_{cold}$ is continuously at the "FALSE" state, occurring when signal $R_{on/off}$ of FIG. 1 is at the "power-off", or second state transistor switch Q2 of FIG. 2 is turned-off.

Because switch Q2 is nonconductive in the "power-off" state, voltage $V_{W1}$ is zero in the "power-off" state. Voltage $V_{W1}$ being of zero volts causes signal $V_{W2}$ to be at zero volts; therefore, the resulting signal $S_{hot}$ is at zero volts. As long as signal $S_{hot}$ is at zero volts, power supply 38 stays turned-off. Thus signal $S_{hot}$ that is conductively isolated from signal $S_{cold}$, contains the "power-on" and "power-off" information of each of signals $R_{on/off}$ and $S_{cold}$.

The positive portion of each retrace pulse of voltage $V_{LV}$ is coupled by a series arrangement of a resistor R5 and a diode CR3 to develop across a capacitor C4 a DC voltage $V_{C4}$ that is equal to the positive peak of voltage $V_{LV}$. Voltage $V_{C4}$ across capacitor C4 is coupled across series coupled resistors R4 and R6. A junction terminal $J_{R4}$ between resistors R4 and R6 is coupled to the base electrode of transistor Q1.

Under normal operating conditions of both voltages $V_{HV}$ and $L_{LV}$ of FIG. 1, the voltage developed at junction $J_{R4}$ is lower than voltage $V_E$, developed at the emitter electrode of transistor Q1 of FIG. 2. transistor Q1, therefore, stays continuously conductive. On the other hand, when voltage $V_{LV}$ of FIG. 2 exceeds the predetermined threshold level, that was mentioned before, the voltage developed at the base electrode of transistor Q1 is sufficiently high so as to cause transistor Q1 to turn off. When transistor Q1 is turned-off, the collector voltage of transistor Q1 is zero. Therefore, the switching operation of transistor switch Q2 does not produce voltage $V_{W1}$ between terminals W1a and W1b of primary winding W1 of transformer T3. It follows that signal $V_{W2}$ at terminal W2a is zero and signal $S_{hot}$ is forced to be at the second, or "power-off" state. When signal $S_{hot}$ is at the second or, "power-off", state power supply 38 of FIG. 1 is turned off, causing voltage B+ to become zero. Voltage B+ at zero volts causes voltage $V_{HV}$ and ultor voltage U to become also zero. Thus, when ultor voltage U becomes excessive, generator 37 generates signal $S_{hot}$ at the second, or "power-off" state that causes ultor voltage U to disappear.

Figure 3:
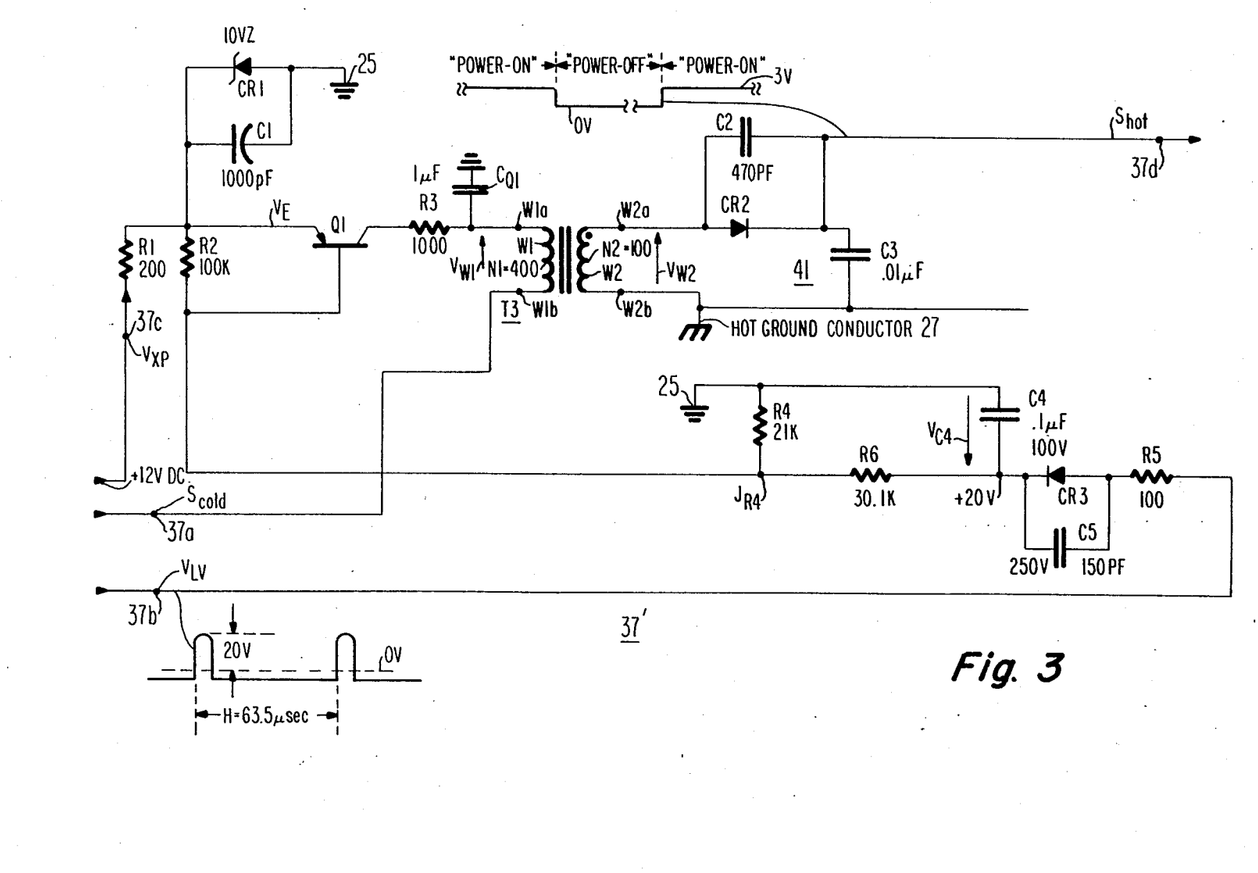
FIG. 3 illustrates a second detailed embodiment of the on/off control signal generator of FIG. 1, embodying a further aspect of the invention.

A generator 37' of FIG. 3, embodying another aspect of the invention, is a second embodiment of generator 37' of FIG. 1. Similar numbers and symbols in FIGS. 1, 2 and 3 indicate similar items or functions. Generator 37' of FIG. 3 is similar to generator 37 of FIG. 2 and operates similarly except that in generator 37' of FIG. 3, signal $S_{cold}$ at output terminal 36c of "AND" gate 36 of FIG. 1 is coupled directly to terminal W1b of transformer T3. When generator 37' of FIG. 3 is used in the system of FIG. 1, it is desirable that "AND" gate 36 of FIG. 1 have sufficient sinking current capability at terminal 36a when signal $S_{cold}$ is at logical "FALSE" for sinking the current that flows in winding W1 of FIG. 3. Also, it is desirable that "AND" gate 36 at terminal 36a have sufficiently high breakdown voltage so as to be able to withstand the flyback voltage that is developed at the collector electrode of transistor switch Q2.

Figure 4:
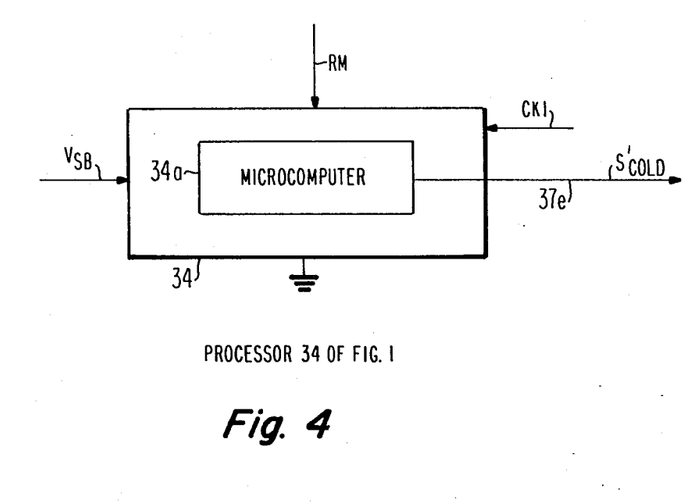
FIG. 4 illustrates a circuit, embodying an additional aspect of the invention, that includes a microprocessor for generating the on/off control signal of FIG. 1.

FIG. 4 illustrates a second embodiment of the function performed by the arrangement of remote signal processor 34, "AND" gate 36 and clock generator 35 of FIG. 1. Similar numbers and symbols in FIGS. 1 and 4 indicate similar items or functions.

In carrying out yet further aspect of the invention, processor 34 of FIG. 4 may include a microcomputer 34a that generates under program control a signal S'$_{cold}$ that is coupled to line 37e of FIG. 1. Signal S'$_{cold}$ of FIG. 4 is substantially equivalent to signal S$_{cold}$ at output terminal 36a of "AND" gate 36 of FIG. 1.

What is claimed:

1. A power supply apparatus, comprising:
    a source of a first on-off control signal having an on-state and an off-state for providing normal operation on-off control;
    means responsive to said first on-off control signal for generating a first AC signal of constant frequency and width during one of said on or off-states and not during the other of said on or off-states;
    a signal transformer having a first winding coupled to said first AC signal for developing in a second winding thereof a second AC signal of constant frequency and width during said one on or off state and not during said other on or off state;
    a source of input supply voltage; and
    a power supply coupled to said source of input supply voltage and to said second winding of said signal transformer for developing an operating voltage only during the on-state of said first on-off control signal.

2. Apparatus according to claim 1 wherein said power supply includes a section responsive to said second AC signal and conductively nonisolated from said input supply voltage, and wherein said first on-off control signal and said first AC signal are conductively isolated from said input supply voltage, the first and second windings of said signal transformer providing an isolation barrier.

3. An apparatus according to claim 2 further comprising a demodulator responsive to said second AC signal for producing therefrom a second on-off control signal having a first state during one of said on and off-states of said first on-off control signal and a second state during the other one of said on and off-states of said first on-off control signal.

4. An apparatus according to claim 3 wherein said second on-off control signal is conductively nonisolated from said input supply voltage and wherein said first on-off control signal is conductively isolated by said transformer from said second on-off control signal.

5. An apparatus according to claim 4 wherein said power supply comprises a regulator control section that regulates said operating voltage, wherein said regulator control section is conductively nonisolated from said second on-off control signal and said input supply voltage and wherein said operating voltage is conductively isolated by said transformer from said regulator control section.

6. An apparatus according to claim 5 wherein said regulator control section includes a driver transformer such that each winding of said transformer is conductively nonisolated from said input supply voltage and said second on-off control signal.

7. An apparatus according to claim 3 wherein said demodulator comprises a peak detector that produces said second on-off control signal by peak detecting said second AC signal in said second winding.

8. An apparatus according to claim 3 wherein said demodulator comprises a two-terminal rectifier that is coupled to said second section only via a passive coupling arrangement.

9. An apparatus according to claim 3 wherein said power supply produces said operating voltage that energizes a deflection circuit of a video display apparatus and wherein said second on-off control signal developing means develops said second control on-off signal that is capable of turning on and of turning off said operating voltage, in accordance with said on and off-states, respectively, of said first on-off control signal.

10. An apparatus according to claim 3 wherein said first on-off control signal is generated by a remote control circuit, in accordance with a user initiated command.

11. An apparatus according to claim 3 wherein said modulator comprises a switch that couples a third AC signal to an output terminal of said switch when said first on-off control signal is at one of said on and off states and that decouples said third AC signal from said output terminal of said switch when said first on-off control signal is at the other state.

12. An apparatus according to claim 3 further comprising a transistor having a control electrode that is responsive to said second AC signal, wherein said first winding of said transformer has a terminal that is coupled to a main current conducting electrode of said transistor such that said transistor generates in said first winding, a current at said constant frequency in accordance with said second AC signal.

13. An apparatus according to claim 3 further comprising means responsive to a third signal and coupled to said second on-off control signal producing means for establishing, in accordance with said third signal, said second on-off control signal that causes said power supply to turn off irrespective of said first on-off control signal.

14. An apparatus according to claim 13 wherein said power supply produces said operating voltage that is used for generating an ultor voltage of a video display apparatus and further comprising means for generating said third signal when the magnitude of said ultor voltage exceeds a predetermined level.

15. An apparatus according to claim 13 further comprising a transistor having a main current conducting electrode that is coupled to a first terminal of said first winding for coupling a source of energizing current to said first winding and wherein said third signal is coupled to a control terminal of said transistor for decoupling said source of energizing current from said first winding when said third signal occurs.

16. An apparatus according to claim 15 further comprising a second transistor having a main current conducting electrode that is coupled to a second terminal of said first winding and having a control electrode that is responsive to said first AC signal.

17. An apparatus according to claim 3 wherein said second AC signal generating means comprises a microcomputer that generates said second AC signal such that said second AC signal has a substantially rectangular waveform when said first on-off control signal is at one of said on and off-states and at a substantially constant level when said first on-off control signal is at the other state.

18. A power supply apparatus, comprising:
    a source of an input supply voltage;
    a source of an input on-off control signal, containing on-off control information, having an on-state and an off-state for providing normal operation on-off control, said source of said on-off control signal being conductively isolated from said input supply voltage;
    a source of an AC signal;

means for modulating said AC signal in accordance with said input on-off control signal to generate a modulated second signal at a frequency that is determined by said first signal that contains the on-off control information of said input on-off control signal;

a signal transformer having a first winding that is coupled to said second signal and a second winding that is conductively isolated from said input on-off control signal for magnetically coupling said second signal to said second winding;

means responsive to a signal that is developed in said second winding for generating an output on-off control signal having an on-state and an off-state that correspond with the on-state and off-state, respectively, of said input on-off control signal; and a power supply having a first section that is magnetically coupled to, and conductively isolated from, said input supply voltage for developing, from an energy that is supplied by said source of said input supply voltage, an operating voltage that is conductively isolated from said input supply voltage, said power supply having a control section that is conductively coupled to both said input supply voltage and to said output on-off control signal such that said transformer conductively isolates said input on-off control signal from said control section and from said output on-off control signal, said output on-off control signal providing only on-off control information to said control section to cause, in accordance with the on-off control information of said input on-off control signal, the normal on-off control of said operating voltage.

19. An apparatus according to claim 18 wherein said control section comprises a pulse width modulator that regulates said operating voltage.

20. An apparatus according to claim 18 wherein each of the on-state and off-state of said output on-off control signal is a DC signal.

* * * * *